(12) United States Patent
Kumar et al.

(10) Patent No.: US 9,625,667 B2
(45) Date of Patent: Apr. 18, 2017

(54) MULTITUBE SEISMIC CABLE

(71) Applicant: Sterlite Technologies Limited, Maharashtra (IN)

(72) Inventors: Sravan Kumar, Telangana (IN); Phill Coppin, Denbigh (GB); Kishore Sahoo, Dadra Nagar Haveli (IN); Shivam Srivastava, Madhya Pradesh (IN); Kangbang Singh Tenzing, Manipur (IN)

(73) Assignee: STERLITE TECHNOLOGIES LIMITED, Aurangabad, Maharashtra (IN)

( * ) Notice: Subject to any disclaimer, the term of this patent is extended or adjusted under 35 U.S.C. 154(b) by 0 days.

(21) Appl. No.: 14/945,875

(22) Filed: Nov. 19, 2015

(65) Prior Publication Data
US 2016/0147028 A1  May 26, 2016

(30) Foreign Application Priority Data

Nov. 20, 2014 (IN) .......................... 3686/MUM/2014

(51) Int. Cl.
*G02B 6/44* (2006.01)
*G02B 6/02* (2006.01)

(52) U.S. Cl.
CPC ....... *G02B 6/4413* (2013.01); *G02B 6/02395* (2013.01); *G02B 6/4415* (2013.01); *G02B 6/4427* (2013.01); *G02B 6/4432* (2013.01); *G02B 6/4434* (2013.01)

(58) Field of Classification Search
CPC ... G02B 6/4432; G02B 6/4434; G02B 6/4413
See application file for complete search history.

(56) References Cited

U.S. PATENT DOCUMENTS

| 2006/0072886 A1* | 4/2006 | Kim ...................... G02B 6/441 385/115 |
| 2010/0158457 A1* | 6/2010 | Drozd .................. G02B 6/4435 385/113 |

FOREIGN PATENT DOCUMENTS

JP          59038702 A   *   3/1984

* cited by examiner

*Primary Examiner* — Omar R Rojas

(57) ABSTRACT

The present disclosure provides an optical fiber cable. The optical fiber cable includes a strength member made of a composite material made of a polymer matrix. The strength member is centrally located. The strength member lies substantially symmetrical along a longitudinal axis of the optical fiber cable. In addition, the optical fiber cable includes a plurality of fiber units. Moreover, the optical fiber cable includes an outer jacket. The outer jacket surrounds the plurality of fiber units. Each of the plurality of fiber units includes one or more optical fibers, a first covering layer, a second covering layer and a gel. The first covering layer is enclosed by the second covering layer. Each of the one or more optical fiber cables is enclosed by the first covering layer.

10 Claims, 13 Drawing Sheets

| ELEMENT | MATERIAL USED | DIMENSIONS |
|---|---|---|
| SECOND OUTER JACKET LAYER | THERMOPLASTIC POLYURETHANE (TPU) | THICKNESS = 1.1 mm ± 0.2 mm<br>OUTER DIAMETER = 7.4 mm ± 0.3 mm |
| FIRST OUTER JACKET LAYER | ARAMID YARNS | THICKNESS = 0.4 mm |
| SECOND COVERING LAYER | POLYPROPYLENE | THICKNESS = 0.225 mm ± 0.05 mm<br>OUTER DIAMETER = 1.8 mm ± 0.05 mm |
| FIRST COVERING LAYER | ACRYLIC (POLYMETHYL METHACRYLATE) | THICKNESS = 0.2 mm ± 0.05 mm |
| CENTRAL CORE | FIBER REINFORCED PLASTIC (FRP) | OUTER DIAMETER = 1.2 mm ± 0.05 mm |
| ONE OR MORE OPTICAL FIBERS | SILICA OPTICAL FIBER COATED WITH POLYMER COATINGS | OUTER DIAMETER = 250 um |

| TEST PERFORMED | CONDITIONS FOR ACCEPTANCE | FINAL RESULTS |
|---|---|---|
| STANDARD REPEATED BENDING TEST: THIS TEST WAS PERFORMED IN ACCORDANCE WITH STANDARD TEST PROCEDURE LAID BY IEC 60794-1-2-E6. THE TEST WAS PERFORMED AT 23°C WITH FOLLOWING SPECIFICATION DETAILS BENDING RADIUS: 37.5 MM NUMBER OF TURNS: 10 NUMBER OF CYCLES: 10000 MASS OF THE WEIGHT: 5KGS | CHANGE IN ATTENUATION SHOULD BE LESS THAN 0.05 DB CABLE SHOULD NOT UNDERGO ANY PHYSICAL DAMAGE NO KINK SHOULD OCCUR ON THE CABLE | CHANGE IN ATTENUATION = 0.015 DB NO PHYSICAL DAMAGE CAUSED TO THE CABLE NO KINKING OCCURRED CABLE PASSED STANDARD REPEATED BENDING TEST IN ACCORDANCE WITH STANDARD TEST PROCEDURE LAID BY IEC 60794-1-2-E6 |

| TEST PERFORMED | CONDITIONS FOR ACCEPTANCE | FINAL RESULTS |
|---|---|---|
| KINK RESISTANCE TEST: THE CABLE WAS WOUND ON A MANDREL OF 25 MM | NO KINK SHOULD OCCUR ON THE CABLE | NO KINK OCCURRED ON THE CABLE  CABLE HAS SUBSTANTIAL KINK RESISTANCE |

FIG. 2B (Continued)

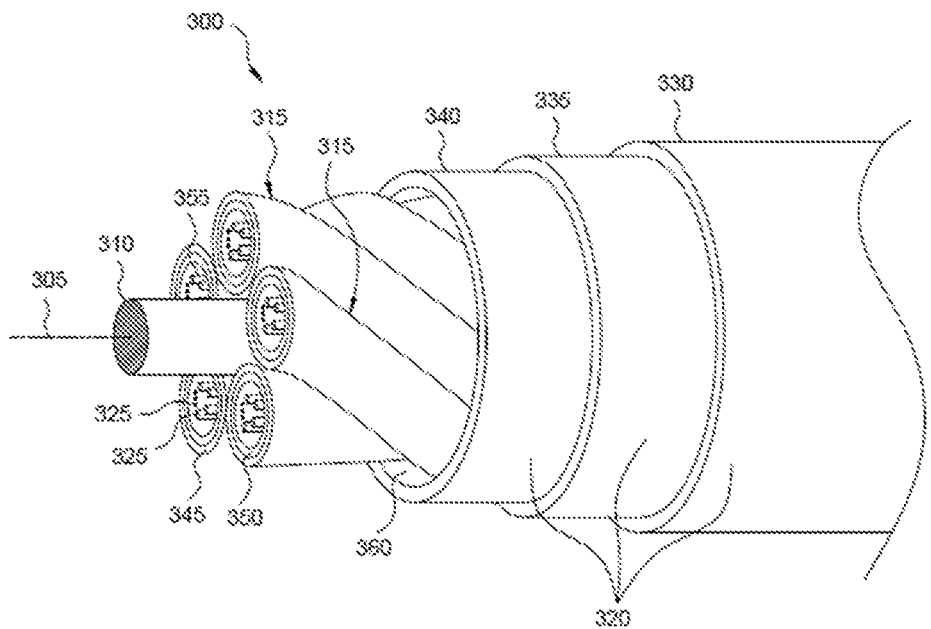

400

| TEST PERFORMED | CONDITIONS FOR ACCEPTANCE | FINAL RESULTS |
|---|---|---|
| STANDARD REPEATED BENDING TEST: THIS TEST WAS PERFORMED IN ACCORDANCE WITH STANDARD TEST PROCEDURE LAID BY IEC 60794-1-2-E6. THE TEST WAS PERFORMED AT 23°C WITH FOLLOWING SPECIFICATION DETAILS: BENDING RADIUS: 37.5 MM NUMBER OF TURNS: 10 NUMBER OF CYCLES: 10000 MASS OF THE WEIGHT: 5KGS | CHANGE IN ATTENUATION SHOULD BE LESS THAN 0.05 DB CABLE SHOULD NOT UNDERGO ANY PHYSICAL DAMAGE NO KINK SHOULD OCCUR ON THE CABLE | CHANGE IN ATTENUATION = 0.015 DB NO PHYSICAL DAMAGE CAUSED TO THE CABLE NO KINKING OCCURRED CABLE PASSED STANDARD REPEATED BENDING TEST IN ACCORDANCE WITH STANDARD TEST PROCEDURE LAID BY IEC 60794-1-2-E6 |

| TEST PERFORMED | CONDITIONS FOR ACCEPTANCE | FINAL RESULTS |
|---|---|---|
| CRUSH TEST:<br><br>THIS TEST WAS PERFORMED IN ACCORDANCE WITH STANDARD TEST PROCEDURE LAID BY IEC 60794-1-2-E3<br><br>THE TEST WAS PERFORMED AT 23°C WITH FOLLOWING SPECIFICATION DETAILS:<br><br>TOTAL APPLIED FORCE: 2000N<br><br>DURATION OF APPLICATION OF THE FORCE: 60 SECS<br><br>NUMBER OF TESTS: 5<br><br>SPACING BETWEEN TEST PLACES: 100 MM | CHANGE IN ATTENUATION SHOULD BE LESS THAN 0.05 DB<br><br>CABLE SHOULD NOT UNDERGO ANY PHYSICAL DAMAGE<br><br>NO KINK SHOULD OCCUR ON THE CABLE | CHANGE IN ATTENUATION = 0.013 DB<br><br>NO PHYSICAL DAMAGE CAUSED TO THE CABLE<br><br>NO KINKING OCCURRED<br><br>CABLE PASSED STANDARD REPEATED BENDING TEST IN ACCORDANCE WITH STANDARD TEST PROCEDURE LAID BY IEC 60794-1-2- E3 |

| TEST PERFORMED | CONDITIONS FOR ACCEPTANCE | FINAL RESULTS |
|---|---|---|
| KINK RESISTANCE TEST: THE CABLE WAS WOUND ON A MANDREL OF 25 MM | NO KINK SHOULD OCCUR ON THE CABLE | NO KINK OCCURRED ON THE CABLE  CABLE HAS SUBSTANTIAL KINK RESISTANCE |

FIG. 4B (Continued)

MULTITUBE SEISMIC CABLE

PRIORITY DETAILS

This application claims the benefit of Indian Application 3686/MUM/2014, filed on Nov. 20, 2014.

TECHNICAL FIELD

The present disclosure relates to the field of optical fiber cables. More specifically, the present disclosure relates to an optical fiber cable which is robust and suitable for underground natural resource exploration applications.

BACKGROUND

In the present age of technological advancements, optical fiber cables are being vastly utilized in different fields for numerous applications. These fields can be telecommunications, communication over passive optical networks, sensor applications, medicinal and surgical applications and the like. One of the prime industries which utilize the optical fiber cable is exploration and production industry. The exploration and production industry employs the optical fibers and cables as sensors for monitoring seismic and other underground field exploration parameters. Also, the optical fiber cables are coupled with sensors to enable optical transmission of sensor signals.

Traditionally, the optical fiber cables employed in areas of oil and gas explorations include multiple buffer tubes which are wound around a strength member. The strength member provides strength and integrity to the optical fiber cable. In addition, each buffer tube includes one or more optical fibers. Moreover, the empty void space inside each of the buffer tubes is typically filled with a gel which blocks moisture and facilitates smooth movement of the optical fibers. Further, the optical fiber cables include a final protection layer known as an outer jacket which surrounds the buffer tubes along with the strength member. The outer jacket protects the optical fiber cable against wear and tear, crushing forces, heat, shock and the like.

The presently available optical fiber cables are found to be inefficient, unreliable and undurable under testing terrains and extreme temperature conditions in the field of underground natural resource explorations. In an example, an optical fiber cable for outdoor applications uses an outer jacket made of Polyethylene which offers resistance against mechanical and thermal shocks. However, this optical fiber cable fails to offer reasonable flexibility which may lead to permanent damage to the cable or induced stresses in the optical fibers within the cable. This results in macro bending losses and transmission losses over long distances. Further, conventional optical fiber cables for outdoor applications lack sufficient resistance against kinking.

Moreover, the conventional optical fiber cables do not enable restriction of movement of the optical fibers within the buffer tubes of the optical fiber cable. This leads to receiving of inaccurate or attenuated readings from the sensors connected to the optical fibers. Furthermore, the conventional optical fiber cables do not deliver reliable performance at extreme temperature conditions. Also, the optical fiber cables may not perform reliably on a broad range of temperature. The above cited drawbacks of conventional optical fiber cables make these cables unsuitable for applications in the field of underground natural resource explorations.

In light of the above stated discussion, there is a need for a robust, reliable and durable optical fiber cable that overcomes the above stated disadvantages and is suitable for being redeployed at different locations in the field of underground natural resource explorations.

SUMMARY

In an aspect of the present disclosure, the present disclosure provides an optical fiber cable. The optical fiber cable includes a strength member. The strength member lies substantially symmetrical along a longitudinal axis of the optical fiber cable. In addition, the optical fiber cable includes a plurality of fiber units. Each of the plurality of fiber units is helically wound around the strength member. Moreover, the optical fiber cable includes an outer jacket. Further, the outer jacket surrounds the plurality of fiber units. The strength member is made of a composite material made of a polymer matrix. The strength member is centrally located. Each of the plurality of fiber units includes one or more optical fibers, a first covering layer, a second covering layer and a gel. The first covering layer is enclosed by the second covering layer. In addition, the first covering layer encloses the gel. The second covering layer is made of a thermoplastic material and the first covering layer is made of an acrylic material. Further, a coefficient of thermal expansion of the thermoplastic material is less than $2.0 \times 10^{-4}/°$ C. Furthermore, the outer jacket includes a second outer jacket layer and a first outer jacket layer. The second outer jacket layer is made of thermoplastic polyurethane and the first outer jacket layer is made of aramid yarns. The second outer jacket layer surrounds the first outer jacket layer.

In an embodiment of the present disclosure, the thermoplastic material of the second covering layer is selected from a group consisting of Polypropylene and Nylon.

In an embodiment of the present disclosure, each of the plurality of fiber units has a cylindrical cross section.

In an embodiment of the present disclosure, the gel is a thixotropic gel layer.

In an embodiment of the present disclosure, the second outer jacket layer has a thickness in a range of 1.1 mm±0.2 mm and a diameter in a range of 7.4 mm±0.3 mm.

In an embodiment of the present disclosure, the second covering layer has a thickness in a range of 0.225 mm±0.05 mm and a diameter in a range of 1.8 mm±0.05 mm.

In an embodiment of the present disclosure, the first covering layer has a thickness in a range of 0.2 mm±0.05 mm.

In an embodiment of the present disclosure, the strength member has a diameter in a range of 1.2 mm±0.05 mm.

In an embodiment of the present disclosure, the first covering layer and the second covering layer ensures better kink resistance.

In an embodiment of the present disclosure, each of the one or more optical fibers is made of silica optical fiber with polymer coatings.

In another aspect of the present disclosure, the present disclosure provides an optical fiber cable. The optical fiber cable includes a strength member. The strength member lies substantially symmetrical along a longitudinal axis of the optical fiber cable. In addition, the optical fiber cable includes a plurality of fiber units. Each of the plurality of fiber units is wound around the strength member in a helical shape. Moreover, the optical fiber cable includes an outer jacket. Further, the outer jacket surrounds the plurality of fiber units. The strength member is made of a composite material made of a polymer matrix. The strength member is centrally located. Each of the plurality of fiber units includes one or more optical fibers, a first covering layer and a second covering layer. The first covering layer is enclosed by the second covering layer. In addition, each of the one or more optical fiber cables is enclosed by the first covering layer. The second covering layer is made of a thermoplastic material and the first covering layer is made of polymethyl methacrylate. Further, a coefficient of thermal expansion of the thermoplastic material is less than $2.0 \times 10^{-4}/°$ C. Furthermore, the outer jacket includes a third outer jacket layer, a second outer jacket layer and a first outer jacket layer. The second outer jacket layer is made of thermoplastic polyurethane, the first outer jacket layer is made of aramid yarns and the third outer jacket layer is made of 85A polyether type thermoplastic polyurethane. In addition, the second outer jacket layer surrounds the first outer jacket layer, the first outer jacket layer surrounds the third outer jacket layer and the third outer jacket layer surrounds the plurality of fiber units.

In an embodiment of the present disclosure, the thermoplastic material of the second covering layer is selected from a group consisting of Polypropylene and Nylon.

In an embodiment of the present disclosure, each of the plurality of fiber units has a cylindrical cross section.

In an embodiment of the present disclosure, the second outer jacket layer has a thickness in a range of 0.7 mm±0.2 mm and a diameter in a range of 7.4 mm±0.3 mm.

In an embodiment of the present disclosure, the first outer jacket layer has a thickness in a range of 0.4 mm±0.1 mm.

In an embodiment of the present disclosure, the third outer jacket layer has a thickness in a range of 0.4 mm±0.1 mm.

In an embodiment of the present disclosure, the second covering layer has a thickness in a range of 0.225 mm±0.05 mm and a diameter in a range of 1.8 mm±0.05 mm.

In an embodiment of the present disclosure, the first covering layer has a thickness in a range of 0.2 mm±0.05 mm.

In an embodiment of the present disclosure, the strength member has a diameter in a range of 1.2 mm±0.05 mm.

In yet another aspect of the present disclosure, the present disclosure provides an optical fiber cable. The optical fiber cable includes a strength member. The strength member lies substantially symmetrical along a longitudinal axis of the optical fiber cable. In addition, the optical fiber cable includes a plurality of fiber units. Each of the plurality of fiber units is laid around the strength member in a helical pattern. Moreover, the optical fiber cable includes an outer jacket. Further, the outer jacket surrounds the plurality of fiber units. The strength member is made of a composite material made of a polymer matrix. The strength member is centrally located. Each of the plurality of fiber units includes one or more optical fibers, a first covering layer and a second covering layer. The first covering layer is enclosed by the second covering layer. In addition, each of the one or more optical fibers is enclosed by the first covering layer. The second covering layer is made of a thermoplastic material and the first covering layer is made of an acrylic material. Further, a coefficient of thermal expansion of the thermoplastic material is less than $2.0 \times 10^{-4}/°$ C. Furthermore, the outer jacket includes a second outer jacket layer and a first outer jacket layer. The second outer jacket layer is made of thermoplastic polyurethane and the first outer jacket layer is made of aramid yarns. The second outer jacket layer surrounds the first outer jacket layer.

BRIEF DESCRIPTION OF THE FIGURES

Figure 1A:
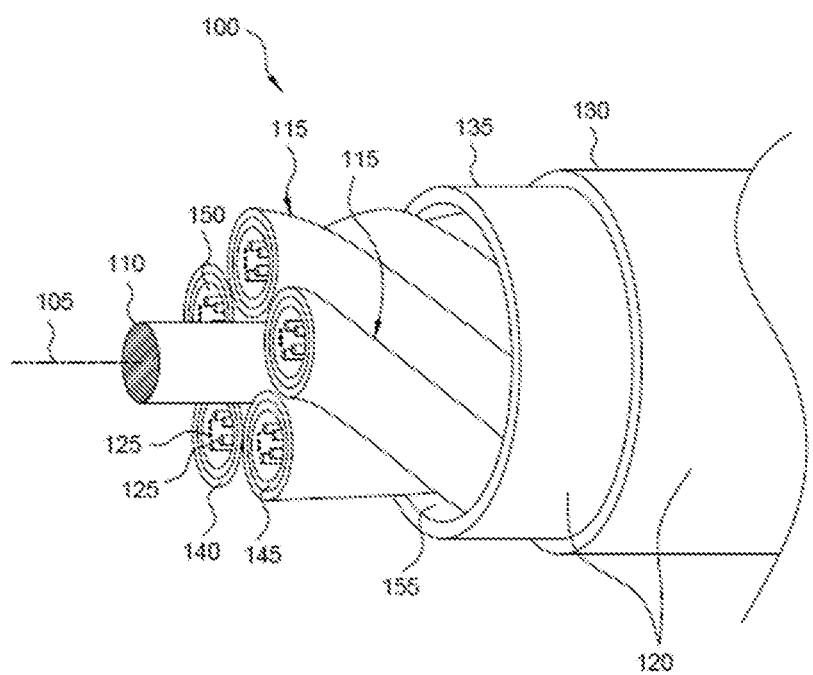
Figure 1B:
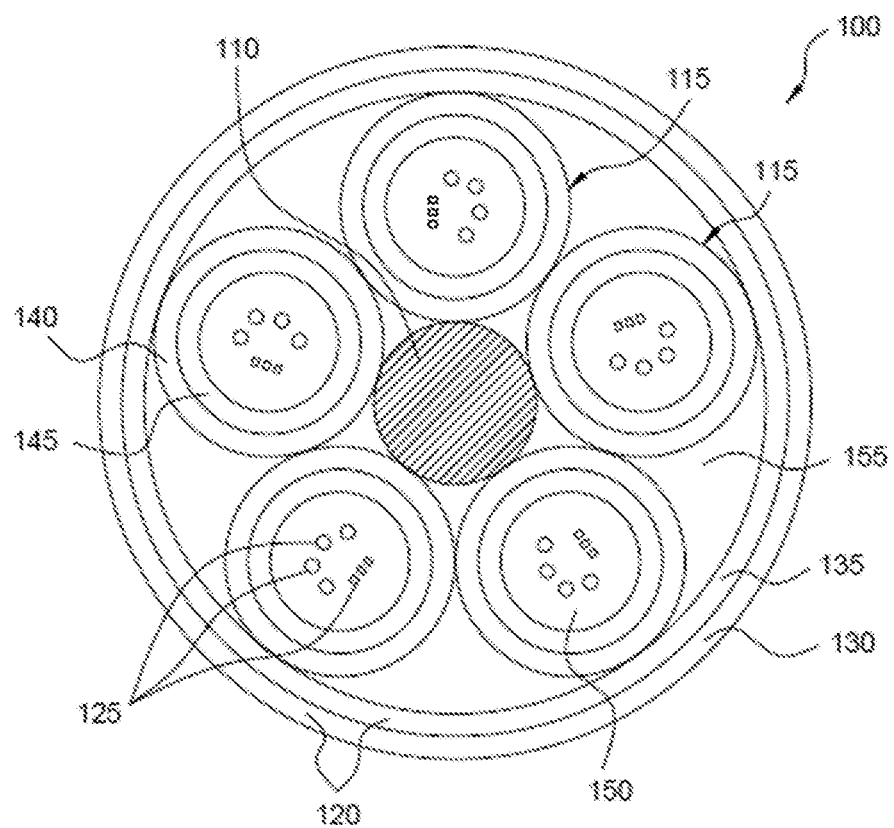
Figure 2B:
Figure 3B:
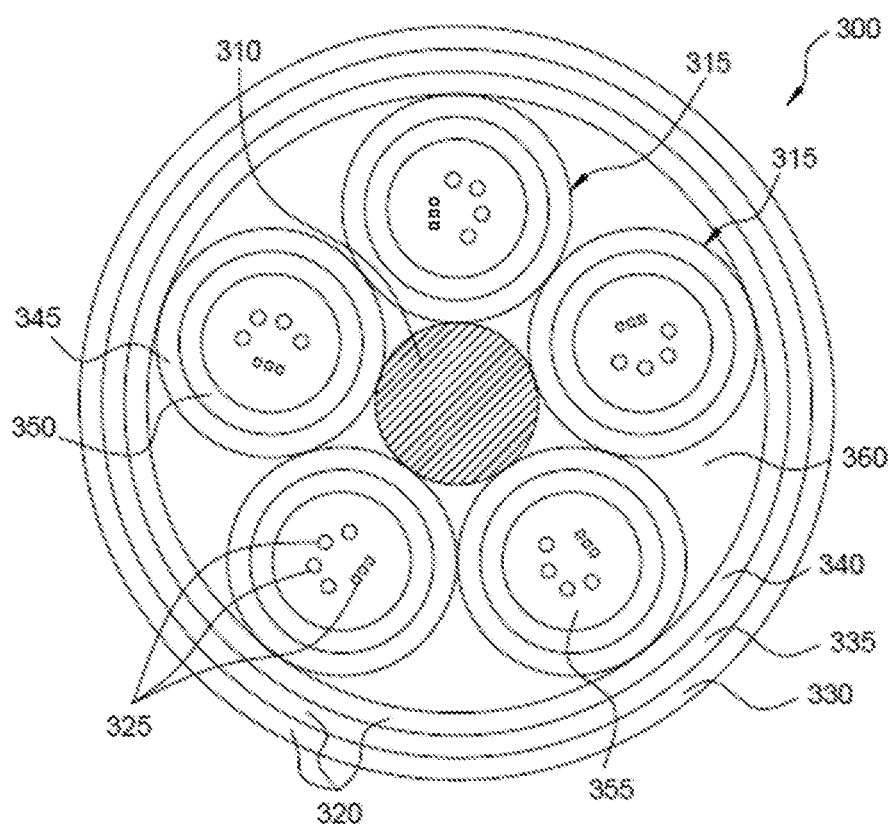
Figure 4A:
Figure 5:
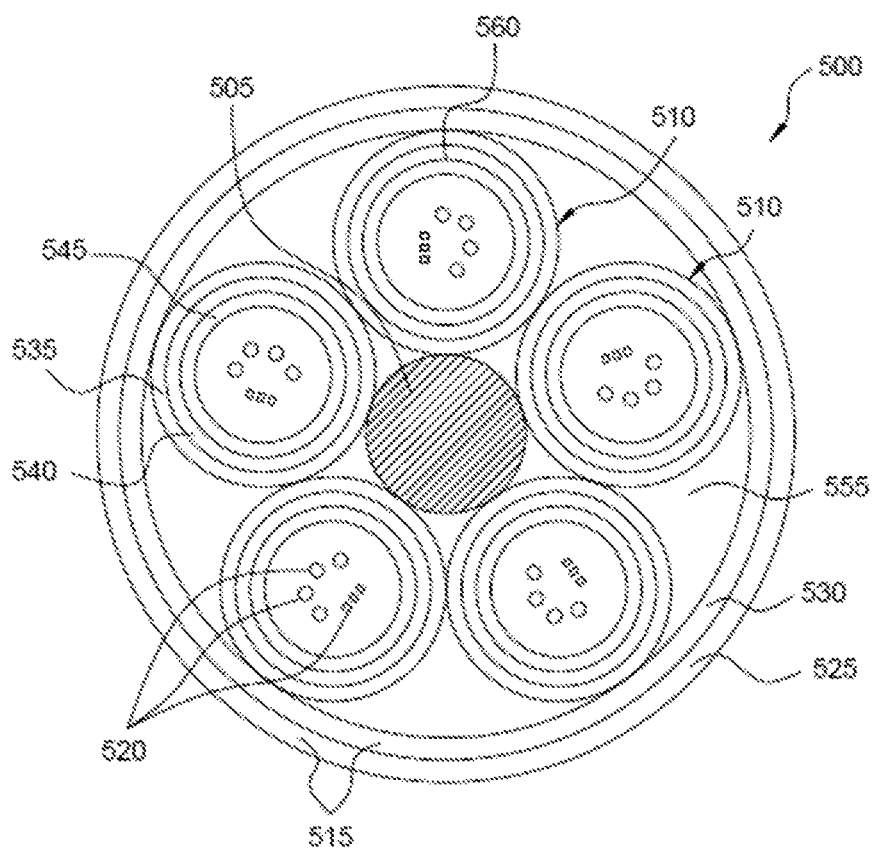

Having thus described the disclosure in general terms, reference will now be made to the accompanying drawings, which are not necessarily drawn to scale, and wherein:

FIG. 1A illustrates a perspective view of an optical fiber cable, in accordance with an embodiment of the present disclosure;

FIG. 1B illustrates a cross-sectional view of the optical fiber cable shown in FIG. 1A, in accordance with an embodiment of the present disclosure;

FIG. 2A illustrates a table for showing dimensional and compositional details of one or more elements of the optical fiber cable provided in FIG. 1A and FIG. 1B, in accordance with an embodiment of the present disclosure;

FIG. 2B illustrates another table for showing results of one or more tests performed on the optical fiber cable provided in FIG. 1A and FIG. 1B, in accordance with an embodiment of the present disclosure;

FIG. 3A illustrates a perspective view of the optical fiber cable, in accordance with another embodiment of the present disclosure;

FIG. 3B illustrates a cross-sectional view of the optical fiber cable shown in FIG. 3A, in accordance with another embodiment of the present disclosure;

FIG. 4A illustrates a table for showing the dimensional and the compositional details of the one or more elements of the optical fiber cable provided in FIG. 3A and FIG. 3B, in accordance with another embodiment of the present disclosure;

FIG. 4B illustrates another table for showing the results of the one or more tests performed on the optical fiber cable, in accordance with another embodiment of the present disclosure; and FIG. 5 illustrates a cross-sectional view of the optical fiber cable, in accordance with yet another embodiment of the present disclosure.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present technology. Similarly, although many of the features of the present technology are described in terms of each other, or in conjunction with each other, one skilled in the art will appreciate that many of these features can be provided independently of other features. Accordingly, this description of the present technology is set forth without any loss of generality to, and without imposing limitations upon, the present technology.

FIG. 1A illustrates a perspective view of an optical fiber cable 100, in accordance with an embodiment of the present disclosure. The optical fiber cable 100 is suitable for use in a field of underground natural resource explorations. The underground natural resource explorations include gas exploration, oil exploration and the like. Moreover, the optical fiber cable 100 can be operationally coupled with one or more sensor arrays to sense and/or monitor various underground operational parameters. The underground operational parameters pertain to the oil and gas explorations. Further, the optical fiber cable 100 may be referred to as seismic sensor array optical fiber cable. Furthermore, the optical fiber cable 100 may simply be used to transmit optical signals (which may carry sensor data or communication data) to a receiver from the site of oil and gas explorations.

Going further, the optical fiber cable 100 includes a strength member 110, a plurality of fiber units 115 and an outer jacket 120. In addition, the strength member 110 has a circular cross-section (as illustrated in a cross sectional view of the optical fiber cable 100 in FIG. 1B) and lies substantially symmetrical around a longitudinal axis 105. Further, the strength member 110 is made of a composite material made of a polymer matrix. The strength member 110 is centrally located. In an embodiment of the present disclosure, the composite material is flexible fiber reinforced plastic. The fiber reinforced plastic is a composite material made of a polymer matrix reinforced with glass fibers. Examples of the fiber reinforced plastic include glass fiber, carbon fiber, aramid fiber, basalt fiber and the like. Moreover, the strength member 110 provides physical strength to the optical fiber cable 100 and resists over bending of the optical fiber cable 100.

Further, each of the plurality of fiber units 115 is laid around the strength member 110 in a helical pattern. Also, a cross section of each of the plurality of fiber units 115 is cylindrical in shape. In addition, a packing density of each of the plurality of fiber units 115 is greater than 90%.

Further, each of the plurality of fiber units 115 includes one or more optical fibers 125, a second covering layer 145 and a first covering layer 140. In addition, each of the one or more optical fibers 125 is a colored ink coated optical fiber. Furthermore, an outer diameter of each of the one or more optical fibers 115 is less than 262 microns. In an embodiment of the present disclosure, each of the plurality of fiber units 115 includes twelve optical fibers. In an embodiment of the present disclosure, total number of the optical fibers within the optical fiber cable 100 is (12×5)=60.

In addition, each of the one or more optical fibers 125 is selected from a group consisting of ITU-T G.652B optical fiber, ITU-T G.652D optical fiber, ITU-T G.657A1 optical fiber and ITU-T G.657A2 optical fiber. Moreover, each of the one or more optical fibers 125 is selected from a group consisting of ITU-T G.657B2 optical fiber, ITU-T G.657B3 optical fiber and ITU-T G.655C optical fiber. Further, each of the one or more optical fibers 125 is selected from a group consisting of ITU-T G.655D optical fiber and ITU-T G.655E optical fiber.

In an embodiment of the present disclosure, each of the one or more optical fibers 125 is a single mode optical fiber. In another embodiment of the present disclosure, each of the one or more optical fibers 125 is a multimode optical fiber. Also, each of the one or more optical fibers 125 is a silica optical fiber with polymer coatings. Each of the plurality of fiber units 115 is similar in structure and dimensions. Also, each of the one or more optical fibers 125 has similar shape, structure, dimensions and optical characteristics.

In addition, each of the plurality of fiber units 115 includes a second covering layer 140 and a first covering layer 145 (also illustrated in the cross sectional view of the optical fiber cable 100 in the FIG. 1B). The first covering layer 145 is enclosed by the second covering layer 140. Moreover, each of the one or more optical fibers 125 is enclosed by the first covering layer 145. Further, the second covering layer 140 is made of a thermoplastic material. The thermoplastic material is a material which becomes soft when heated and hard when cooled. Furthermore, a coefficient of thermal expansion of the thermoplastic material is less than $2.0 \times 10^{-4}/^\circ$ C. The thermal expansion is a tendency of the thermoplastic material to change in shape, area and/or volume in response to a change in temperature. Also, the thermoplastic material is selected from a group. The group consists of polypropylene and nylon. In addition, polypropylene exhibits low shrinkage and provides low thickness layers.

Moreover, the first covering layer 145 is made of polymethyl methacrylate (an acrylic material). In addition, polymethyl methacrylate is a transparent and rigid plastic made from polymerization of methyl methacrylate. Accordingly, the second covering layer 140 and the first covering layer 145 collectively form each of the plurality of fiber units 115. Moreover, the second covering layer 140 and the first covering layer 145 are not foamed due to which each of the plurality of fiber units 115 achieve better robustness and kink resistance. In an embodiment of the present disclosure, the second covering layer 140 and the first covering layer 145 ensure better kink resistance. Also, the first covering layer 145 of each of the plurality of fiber units 115 directly surrounds a void 150.

Going further, the outer jacket 120 surrounds each of the plurality of fiber units 115 (also illustrated in the cross sectional view of the optical fiber cable 100 in the FIG. 1B). The outer jacket 120 includes a second outer jacket layer 130 and a first outer jacket layer 135. Moreover, the second outer jacket layer 130 is made of thermoplastic polyurethane and the first outer jacket layer 135 is made of aramid yarns. The aramid yarns are high-performance fibers with molecules that are characterized by relatively rigid polymer chains. Also, thermoplastic polyurethane is a class of polyurethane plastics which consists of linear segmented block copolymers composed of soft and hard segments. In addition, the second outer jacket layer 130 provides protection and enhances flexibility of the optical fiber cable 100. Also, the second outer jacket layer 130 surrounds the first outer jacket layer 135 and forms an outermost covering of the optical fiber cable 100. Accordingly, the first outer jacket layer 135 surrounds the plurality of fiber units 115 and the strength member 110. The first outer jacket layer 135 packs the helically wound plurality of fiber units 115 to maintain the helical winding pattern over the strength member 110. Further, a void 155 represents an unoccupied free space of the optical fiber cable 100 surrounded by the outer jacket 120.

FIG. 2A illustrates a table 200 for showing dimensional and compositional details of one or more elements of the optical fiber cable 100, in accordance with an embodiment of the present disclosure. In an example, the optical fiber cable 100 possesses a length of 1 kilometer. Moreover, the optical fiber cable 100 has structure and dimensions as described in the table 200. The one or more elements of the optical fiber cable 100 include the second outer jacket layer 130, the first outer jacket layer 135, the second covering layer 140, the first covering layer 145, a central core and the one or more optical fibers 125. In addition, the central core is the strength member 110.

Going further, the table 200 shows various dimensional values of the one or more elements of the optical fiber cable 100. Also, the table 200 shows various materials used for constructing each of the one or more elements. Accordingly, the various dimensions include a thickness and an outer diameter. In addition, the material used for the second outer jacket layer 130 is thermoplastic urethane (TPU). Further, the thickness of the second outer jacket layer 130 is 1.1 mm±0.2 mm and the outer diameter of the second outer jacket layer 130 is 7.4 mm±0.3 mm. Furthermore, the material used for the first outer jacket layer 135 is aramid yarns and the thickness of the first outer jacket layer 135 is 0.4 mm.

In addition, the material used for the second covering layer 140 is polypropylene. Moreover, the thickness of the second covering layer 140 is 0.225 mm±0.05 mm and the outer diameter of the second covering layer 140 is 1.8 mm±0.05 mm. Further, the material used for the first covering layer 145 is polymethyl methacrylate and the thickness of the first covering layer 145 is 0.2 mm±0.05 mm. Going further, the material used for the central core is fiber reinforced plastic and the outer diameter of the central core is 1.2 mm±0.05 mm. In addition, the material used for each of the one or more optical fibers 125 is silica optical fiber coated with polymer coatings and the outer diameter of each of the one or more optical fibers 125 is 250 μm.

FIG. 2B illustrates another table 200 for showing results of one or more tests performed on the optical fiber cable 100, in accordance with an embodiment of the present disclosure. The one or more tests correspond to performance tests conducted on the optical fiber cable 100. Moreover, the table 200 shows details and results of the performance tests conducted on the optical fiber cable 100. In addition, the one or more tests include standard repeated bending test, crush test and kink resistance test. Each of the one or more tests includes one or more conditions for acceptance of the optical fiber cable 100 to be declared as a quality product. The quality is based on change in attenuation, physical damage and kinking.

Going further, the first test performed on the optical fiber cable 100 is the standard repeated bending test. The standard repeated bending test is performed in accordance with a standard test procedure laid by IEC 60794-1-2-E6. Moreover, the standard repeated bending test is performed at 23° C. with one or more specification details. The one or more specification details include a bending radius of 37.5 millimeters, number of turns equal to 10, number of cycles equal to 10000 and mass of the weight equal to 5 Kilograms. Moreover, the one or more conditions for acceptance include the change of attenuation to be less than 0.05 decibel, no physical damage undergone by optical fiber cable 100 and no kink should occur on the optical fiber cable 100.

Further, the standard repeated bending test is performed on the optical fiber cable 100 and the change in attenuation is 0.015 decibel which is less than 0.05 decibel. Also, no physical damage and kinking occurred on the optical fiber cable 100. Further, the optical fiber cable 100 passes the standard repeated bending test in accordance with the standard test procedure laid by IEC 60794-1-2-E6.

Going further, the second test performed on the optical fiber cable 100 is the crush test. The crush test is performed in accordance with a standard test procedure laid by IEC 60794-1-2-E3. Moreover, the standard repeated bending test is performed at 23° C. with no rotation of the optical fiber cable 100 and one or more specification details. The one or more specification details include a total applied force of 2000 Newton, duration of application of the force is 60 seconds, number of tests equal to 5 and spacing between test places is 100 millimeter. Moreover, the one or more conditions for acceptance for the crush test include the change of attenuation to be less than 0.05 decibel, no physical damage undergone by optical fiber cable 100 and no kink should occur on the optical fiber cable 100.

Further, the crush test is performed on the optical fiber cable 100 and the change in attenuation is 0.013 dB which is less than 0.05 dB. Also, no physical damage and kinking occurred on the optical fiber cable 100. Further, the optical fiber cable 100 passes the crush test in accordance with the standard test procedure laid by IEC 60794-1-2-E3.

Going further, the third test performed on the optical fiber cable 100 is the kink resistance test. Moreover, the kink resistance test involves wounding the optical fiber cable 100 on a mandrel of 25 millimeter. Moreover, the one or more conditions for acceptance for the kink resistance test include that no kink should occur on the optical fiber cable 100. Further, the crush test is performed on the optical fiber cable 100 and no kink occurred on the optical fiber cable 100. Further, the optical fiber cable 100 passes the kink resistance test and has substantial kink resistance.

FIG. 3A illustrates a perspective view of an optical fiber cable 300, in accordance with another embodiment of the present disclosure. The optical fiber cable 300 is suitable for use in a field of underground natural resource explorations. The underground natural resource explorations include gas exploration, oil exploration and the like. Moreover, the optical fiber cable 300 can be operationally coupled with one or more sensor arrays to sense and/or monitor various underground operational parameters. The underground operational parameters pertain to the oil and gas explorations. Further, the optical fiber cable 300 may be referred to as seismic sensor array optical fiber cable. Furthermore, the optical fiber cable 300 may simply be used to transmit optical signals (which may carry sensor data or communication data) to a receiver from the site of oil and gas explorations.

Going further, the optical fiber cable 300 includes a strength member 310, a plurality of fiber units 315 and an outer jacket 320. In addition, the strength member 310 has a circular cross-section (as illustrated in a cross sectional view of the optical fiber cable 300 in FIG. 3B) and lies substantially symmetrical around a longitudinal axis 305. Further, the strength member 310 is made of a composite material made of a polymer matrix. The strength member is centrally located. In an embodiment of the present disclosure, the strength member 310 is made of flexible fiber reinforced plastic. The fiber reinforced plastic is a composite material made of a polymer matrix reinforced with glass fibers. Moreover, the strength member 310 provides physical strength to the optical fiber cable 300, resists over bending of the optical fiber cable 300 due bending and/or crushing forces and acts as an anti-buckling agent.

Further, each of the plurality of fiber units 315 is wound around the strength member 310 in a helical shape. Each of the plurality of fiber units 315 is hollow. Also, a cross section of each of the plurality of fiber units 315 is circular in shape. In addition, a packing density of each of the plurality of fiber units 315 is greater than 90%.

Going further, each of the plurality of fiber units 315 includes one or more optical fibers 325, a second covering layer 345 and a first covering layer 350. In addition, each of the one or more optical fibers 325 is a colored ink coated optical fiber. Furthermore, an outer diameter of each of the one or more optical fibers is less than 262 microns. In an embodiment of the present disclosure, each of the plurality of fiber units 315 includes twelve optical fibers. In an embodiment of the present disclosure, total number of the optical fibers within the optical fiber cable 300 is (12×5)=60.

In addition, each of the one or more optical fibers 325 is selected from a group consisting of ITU-T G.652B optical fiber, ITU-T G.652D optical fiber, ITU-T G.657A1 optical fiber and ITU-T G.657A2 optical fiber. Moreover, each of the one or more optical fibers 325 is selected from a group consisting of ITU-T G.657B2 optical fiber, ITU-T G.657B3 optical fiber and ITU-T G.655C optical fiber. Further, each of the one or more optical fibers 325 is selected from a group consisting of ITU-T G.655D optical fiber and ITU-T G.655E optical fiber.

In an embodiment of the present disclosure, each of the one or more optical fibers 325 is a single mode optical fiber. The single mode optical fiber is a fiber designed for transmission of single ray of light. In another embodiment of the present disclosure, each of the one or more optical fibers 325 is a multimode optical fiber. The multimode optical fiber is a fiber designed to carry multiple rays of light concurrently. Also, each of the one or more optical fibers 325 is a glass fiber with polymer coatings. Each of the plurality of fiber units 325 is similar in structure and dimensions. Also, each of the one or more optical fibers 325 has similar shape, structure, dimensions and optical characteristics.

In addition, each of the plurality of fiber units 315 includes a second covering layer 345 and a first covering layer 350 (also illustrated in the cross sectional view of the optical fiber cable 300 in the FIG. 3B). The first covering layer 350 is enclosed by the second covering layer 345. Moreover, each of the one or more optical fibers 325 is enclosed by the first covering layer 350. Further, the second covering layer 345 is made of a thermoplastic material. Furthermore, a coefficient of thermal expansion of the thermoplastic material is less than $2.0 \times 10^{-4}/°$ C. Also, the thermoplastic layer of the second covering layer 345 is selected from a group. The group consists of polypropylene and nylon. In addition, polypropylene exhibits low shrinkage and provides low thickness layers.

Moreover, the first covering layer 350 is made of polymethyl methacrylate (an acrylic material). Accordingly, the second covering layer 345 and the first covering layer 350 collectively form each of the plurality of fiber units 315. Moreover, the second covering layer 345 and the first covering layer 350 are not foamed due to which each of the plurality of fiber units 315 achieve better robustness and kink resistance. In an embodiment of the present disclosure, the second covering layer 345 and the first covering layer 350 ensure better kink resistance. Also, the first covering layer 350 of each of the plurality of fiber units 315 directly surrounds a void 355.

Going further, the outer jacket 320 surrounds each of the plurality of fiber units 315 (also illustrated in the cross sectional view of the optical fiber cable 300 in the FIG. 3B). The outer jacket 320 includes a second outer jacket layer 330, a first outer jacket layer 335 and a third outer jacket layer 340. Each layer is sequentially positioned along the longitudinal axis 305 of the optical fiber cable 300. Moreover, the second outer jacket layer 330 is made of thermoplastic polyurethane, the first outer jacket layer 335 is made of aramid yarns and the third outer jacket layer 340 is made of 85A polyether type thermoplastic polyurethane.

In addition, the second outer jacket layer 330 provides protection and enhances flexibility of the optical fiber cable 300. Also, the second outer jacket layer 330 surrounds the first outer jacket layer 335 and forms an outermost covering of the optical fiber cable 300. Accordingly, the first outer jacket layer 335 surrounds the third outer jacket layer 340 and the third outer jacket layer 340 surrounds the plurality of fiber units 315 and the strength member 310. In an embodiment of the present disclosure, the first outer jacket layer 335 is disposed between the second outer jacket layer 330 and the third outer jacket layer 340. The third outer jacket layer 340 packs the helically wound plurality of fiber units 315 to maintain the helical winding pattern over the strength member 310. Further, a void 360 represents an unoccupied free space of the optical fiber cable 300 surrounded by the outer jacket 320.

FIG. 4A illustrates a table 400 for showing dimensional and compositional details of one or more elements of the optical fiber cable 300, in accordance with another embodiment of the present disclosure. In an example, the optical fiber cable 300 possesses a length of 1 kilometer. Moreover, the optical fiber cable 300 has structure and dimensions as described in the table 400. The one or more elements of the optical fiber cable 300 include the second outer jacket layer 330, the first outer jacket layer 335 and the third outer jacket layer 340. In addition, the one or more elements of the optical fiber cable 300 include the second covering layer 345, the first covering layer 350, a central core and the one or more optical fibers 325. In addition, the central core is the strength member 310.

Going further, the table 400 shows various dimensional values of the one or more elements of the optical fiber cable 300. Also, the table 400 shows various materials used for constructing each of the one or more elements. Accordingly, the various dimensions include a thickness and an outer diameter. In addition, the material used for the second outer jacket layer 330 is thermoplastic urethane (TPU). Further, the thickness of the second outer jacket layer 330 is 0.7 mm±0.2 mm and the outer diameter of the second outer jacket layer 330 is 7.4 mm±0.3 mm. Furthermore, the material used for the first outer jacket layer 335 is aramid yarns and the thickness of the first outer jacket layer 335 is 0.4 mm±0.1 mm.

In addition, the material used for the third outer jacket layer 340 is 85A polyether type thermoplastic polyurethane (TPU) and the thickness of the third outer jacket layer 340 is 0.4 mm±0.1 mm. Also, the material used for the second covering layer 345 is polypropylene. Moreover, the thickness of the second covering layer 345 is 0.225 mm±0.05 mm and the outer diameter of the second covering layer 345 is 1.8 mm±0.05 mm. Further, the material used for the first covering layer 350 is polymethyl methacrylate and the thickness of the first covering layer 350 is 0.2 mm±0.05 mm. Going further, the material used for the central core is fiber reinforced plastic and the outer diameter of the central core is 1.2 mm±0.05 mm. In addition, the material used for each of the one or more optical fibers 325 is glass fiber with polymer coatings and the outer diameter of each of the one or more optical fibers 325 is 250 μm.

FIG. 4B illustrates another table 400 for showing results of one or more tests performed on the optical fiber cable 300, in accordance with another embodiment of the present disclosure. In addition, the one or more tests correspond to performance tests conducted on the optical fiber cable 300. Moreover, the table 400 shows details and results of the performance tests conducted on the optical fiber cable 300. In addition, the one or more tests include the standard repeated bending test, the crush test and the kink resistance test. Each of the one or more tests includes the one or more conditions for acceptance of the optical fiber cable 300 to be declared as a quality product. The quality is based on the change in attenuation, the physical damage and the kinking.

Going further, the first test performed on the optical fiber cable 300 is the standard repeated bending test. The standard repeated bending test is per formed in accordance with a standard test procedure laid by IEC 60794-1-2-E6. Moreover, the standard repeated bending test is performed at 23° C. with the one or more specification details. The one or more specification details include thebending radius of 37.5 millimeters, the number of turns equal to 10, the number of cycles equal to 10000 and the mass of the weight equal to 5 Kilograms. Moreover, the one or more conditions for acceptance include the change of attenuation to be less than 0.05 decibel, no physical damage undergone by optical fiber cable 300 and no kink should occur on the optical fiber cable 300.

Further, the standard repeated bending test is performed on the optical fiber cable 300 and the change in attenuation is 0.015 decibel which is less than 0.05 decibel. Also, no physical damage and kinking occurred on the optical fiber cable 300. Further, the optical fiber cable 300 passes the standard repeated bending test in accordance with the standard test procedure laid by IEC 60794-1-2-E6.

Going further, the second test performed on the optical fiber cable 300 is the crush test. The crush test is performed in accordance with a standard test procedure laid by IEC 60794-1-2-E3. Moreover, the standard repeated bending test is performed at 23° C. with the one or more specification details. The one or more specification details include the total applied force of 2000 Newton, the duration of application of the force is 60 seconds, the number of tests equal to 5 and the spacing between test places is 100 millimeters. Moreover, the one or more conditions for acceptance for the crush test include the change of attenuation to be less than 0.05 decibel, no physical damage undergone by optical fiber cable 300 and no kink should occur on the optical fiber cable 300.

Further, the crush test is performed on the optical fiber cable 300 and the change in attenuation is 0.013 dB which is less than 0.05 dB. Also, no physical damage and kinking occurred on the optical fiber cable 300. Further, the optical fiber cable 300 passes the crush test in accordance with the standard test procedure laid by IEC 60794-1-2-E3.

Going further, the third test performed on the optical fiber cable 300 is the kink resistance test. Moreover, the kink resistance test involves wounding the optical fiber cable 300 on a mandrel of 25 millimeters. Moreover, the one or more conditions for acceptance for the kink resistance test include that no kink should occur on the optical fiber cable 300. Further, the crush test is performed on the optical fiber cable 300 and no kink occurred on the optical fiber cable 300. Further, the optical fiber cable 300 passes the kink resistance test and possesses substantial kink resistance.

FIG. 5 illustrates a cross-sectional view of an optical fiber cable 500, in accordance with yet another embodiment of the present disclosure. In addition, the optical fiber cable 500 is suitable for use in a field of underground natural resource explorations. The underground natural resource explorations include gas exploration, oil exploration and the like. Moreover, the optical fiber cable 500 can be operationally coupled with one or more sensor arrays to sense and/or monitor various underground operational parameters. The underground operational parameters pertain to the oil and gas explorations. Further, the optical fiber cable 500 may be referred to as seismic sensor array optical fiber cable. Furthermore, the optical fiber cable 500 may simply be used to transmit optical signals (which may carry sensor data or communication data) to a receiver from the site of oil and gas explorations.

Going further, the optical fiber cable 500 includes a strength member 505, a plurality of fiber units 510 and an outer jacket 515. In addition, the strength member 505 has a circular cross-section and lies substantially symmetrical around a longitudinal axis. Further, the strength member 505 is made of a composite material made of a polymer matrix. The strength member 505 is centrally located. In an embodiment of the present disclosure, the composite material is flexible fiber reinforced plastic. The fiber reinforced plastic is a composite material made of a polymer matrix reinforced with glass fibers. Moreover, the strength member 505 provides physical strength to the optical fiber cable 500, resists over bending of the optical fiber cable 500 due bending and/or crushing forces and acts as an anti-buckling agent.

Further, each of the plurality of fiber units 510 is helically wound around the strength member 505. In an embodiment of the present disclosure, each of the plurality of fiber units 510 is laid around the strength member 505 in a helical pattern. Also, a cross section of each of the plurality of fiber units 510 is cylindrical in shape. In addition, a packing density of each of the plurality of fiber units 510 is greater than 90%.

Further, each of the plurality of fiber units 510 includes one or more optical fibers 520, a second covering layer 535, a first covering layer 540 and a gel 545. In addition, each of the one or more optical fibers 520 is a colored ink coated optical fiber. In an embodiment of the present disclosure, each of the plurality of fiber units 510 includes twelve optical fibers. In an embodiment of the present disclosure, total number of the optical fibers within the optical fiber cable 500 is (12×5)=60.

In addition, each of the one or more optical fibers 520 is selected from a group consisting of ITU-T G.652B optical fiber, ITU-T G.652D optical fiber, ITU-T G.657A1 optical fiber and ITU-T G.657A2 optical fiber. Moreover, each of the one or more optical fibers 520 is selected from a group consisting of ITU-T G.657B2 optical fiber, ITU-T G.657B3 optical fiber and ITU-T G.655C optical fiber. Further, each of the one or more optical fibers 520 is selected from a group consisting of ITU-T G.655D optical fiber and ITU-T G.655E optical fiber.

In an embodiment of the present disclosure, each of the one or more optical fibers 520 is a single mode optical fiber. In another embodiment of the present disclosure, each of the one or more optical fibers 520 is a multimode optical fiber. Also, each of the one or more optical fibers 520 is a silica optical fiber with polymer coatings. Each of the plurality of fiber units 510 is similar in structure and dimensions. Also, each of the one or more optical fibers 520 has similar shape, structure, dimensions and optical characteristics.

In addition, each of the plurality of fiber units 510 includes a second covering layer 535, a first covering layer 540 and a gel 545. The first covering layer 540 is enclosed by the second covering layer 535. In addition, the first covering layer 540 encloses the gel 545. In an embodiment of the present disclosure, a first inner portion 560 of the first covering layer 540 encloses the gel 545. In an embodiment of the present, the gel 545 is a thixotropic gel layer. The thixotropic gel is a viscous fluid or gel under static conditions and flow when shaken or agitated. Further, the second covering layer 535 is made of a thermoplastic material. Furthermore, a coefficient of thermal expansion of the thermoplastic material is less than $2.0 \times 10^{-4}/°C$. Also, the thermoplastic material is selected from a group. The group consists of polypropylene and nylon. In addition, polypropylene exhibits low shrinkage and provides low thickness layers. Moreover, the first covering layer 540 is made of polymethyl methacrylate (an acrylic material).

Going further, the gel 545 directly surrounds a void 555 and the one or more optical fibers 520 within each of the plurality of compact fiber unit 510. In addition, the gel 545 prevents sticking of the one or more optical fibers 520 with the inner surface of the first covering layer 540. In an embodiment of the present disclosure, the thixotropic gel has sufficient viscosity to resist shear forces as a result of a weight of the one or more optical fibers 520. Accordingly, the gel 545 prevents stresses induced on the optical fiber 520 due to sticking with the inner surface of the first covering layer 540.

Going further, the outer jacket 515 surrounds each of the plurality of fiber units 510. The outer jacket 515 includes a second outer jacket layer 525 and a first outer jacket layer 530. Moreover, the second outer jacket layer 525 is made of thermoplastic polyurethane and the first outer jacket layer 530 is made of aramid yarns. In addition, the second outer jacket layer 525 provides protection and enhances flexibility of the optical fiber cable 500. Also, the second outer jacket layer 525 surrounds the first outer jacket layer 530 and forms an outermost covering of the optical fiber cable 500. Accordingly, the first outer jacket layer 525 surrounds the plurality of fiber units 510 and the strength member 505. The first outer jacket layer 530 packs the helically wound plurality of fiber units 510 to maintain the helical winding pattern over the strength member 505. Further, a void 555 represents an unoccupied free space of the optical fiber cable 500 surrounded by the outer jacket 515.

Going further, the dimensional details and material composition details of components of the optical fiber cable 500 are similar to the dimensional details and material composition details of components of the optical fiber cable 100. Also, thickness of the layer of gel 545 within each of the plurality of fiber units 510 is variable throughout since thixotropic gel is a non-solid component (or semi-solid component). In addition, the performance of the optical fiber cable 500 is at par with the performance of the optical fiber cable 100. In addition, the optical fiber cable 500 has an additional advantage over the optical fiber cable 100 due to presence of the gel 545. The optical fiber cable 500 is more immune from losses induced in the optical fiber 100 due to sticking of the one or more optical fibers 125 with internal walls of the plurality of fiber units 115.

In an embodiment of the present disclosure, the one or more optical fibers 125 may be selected from various categories of optical fibers. The various categories include multi-core optical fibers, multi-mode optical fibers, plastic/polymer optical fibers, nano-structured optical fibers and specialty optical fibers. In another embodiment of the present disclosure, the optical fiber cable 100 may have colored optical fibers in the plurality of fiber units 115. In an embodiment of the disclosure, the optical fiber cable 100 may have holey or photonic crystal optical fibers in the plurality of fiber units 115.

In an embodiment of the present disclosure, the number of compact fiber units inside the optical fiber cable may vary. In another embodiment of the present disclosure, the number of optical fibers in the plurality of fiber units may vary. In an embodiment of the present disclosure, a compact packing of the one or more optical fibers 125 within the plurality of fiber units 115 reduces free movement of the one or more optical fibers 125.

In an embodiment of the present disclosure, the packing density within cross-section of a compact fiber unit of the plurality of fiber units 115 is defined as a ratio of A1/A2. In addition, A1 represents diameter (in millimeters) of a circle of smallest area within which cross-sections of each of the one or more optical fibers 125. Mathematically, A1 can be calculated as follows:

$$A1 = (1.155) \times (d) \times \sqrt{n}$$

where:
'd' is diameter (in millimeters) of an optical fiber included in the compact fiber unit
'n' represents total count of optical fibers contained within the compact fiber unit.
A2 represents inner diameter (in millimeters) of the second covering layer 145 of the compact fiber unit In an embodiment of the present disclosure, A2 represents an inner diameter of the first covering layer 350. In another embodiment of the present disclosure, A2 represents an inner diameter of the first covering layer 540 (which is same as the diameter of interface of first covering layer 540 and the outer diameter of the gel 545).

In an embodiment of the present disclosure, the first outer jacket layer 335 of the outer jacket 320 of the optical fiber cable 300 further includes two sub-layers of aramid yarns. The sub-layers include a first sub-layer and a second sub-layer. The first sub-layer includes aramid yarns wound around the third outer jacket layer 340 of the outer jacket 320 in a clockwise direction. The second sub-layer includes aramid yarns wound around the first sub-layer in anti-clockwise direction (i.e. in a direction which is reverse of the direction of winding of the first sub-layer). Moreover, provision of two layers of aramid yarns wound in clockwise and anticlockwise manner enhances robustness of the optical fiber cable 300 against twisting. Also, presence of feature of robustness against twisting makes the optical fiber cable 300 suited for redeployment.

In an embodiment of the present disclosure, the strength member 110 of the optical fiber cable 100 has a hollow tubular structure. In another embodiment of the present disclosure, the strength member 110 is in the form of a hollow fiber reinforced plastic tube. In an embodiment of the present disclosure, the plurality of fiber units 115 is wound over the strength member 110 in reverse oscillation manner. The manner in which the direction of helical winding of the plurality of fiber units 115 is reversed after fixed spans of cable length.

In an embodiment of the present disclosure, one or more binding threads may be wound over the assembly of the plurality of fiber units to keep them in place around the strength member. The one or more binding threads is utilized to maintain compaction and keep the plurality of fiber units in place over the strength member.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the disclosure have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. An optical fiber cable comprising:
a strength member substantially symmetrical along a longitudinal axis of the optical fiber cable, wherein the strength member is made of a composite material made of a polymer matrix, wherein the strength member is centrally located;
a plurality of fiber units being wound around the strength member in a helical shape, wherein each of the plurality of fiber units comprises:
one or more optical fibers;
a first covering layer; and
a second covering layer,
wherein the first covering layer is enclosed by the second covering layer, wherein each of the one or more optical fibers is enclosed by the first covering layer, wherein the second covering layer is made of a thermoplastic material and the first covering layer is made of polymethyl methacrylate, wherein a coefficient of thermal expansion of the thermoplastic material is less than $2.0\times10^{-4}/°$ C.; and
an outer jacket surrounding each of the plurality of fiber units, wherein the outer jacket further comprises:
a third outer jacket layer;
a second outer jacket layer; and
a first outer jacket layer,
wherein the second outer jacket layer is made of thermoplastic polyurethane, the first outer jacket layer is made of aramid yarns and the third outer jacket layer is made of 85A polyether type thermoplastic polyurethane, wherein the second outer jacket layer surrounds the first outer jacket layer, the first outer jacket layer surrounds the third outer jacket layer and the third outer jacket layer surrounds the plurality of fiber units.

2. The optical fiber cable as recited in claim 1, wherein the thermoplastic material of the second covering layer is selected from a group consisting of Polypropylene and Nylon.

3. The optical fiber cable as recited in claim 1, wherein each of the plurality of fiber units has a cylindrical cross section.

4. The optical fiber cable as recited in claim 1, wherein the second outer jacket layer has a thickness in a range of 0.7 mm±0.2 mm and a diameter in a range of 7.4 mm±0.3 mm.

5. The optical fiber cable as recited in claim 1, wherein the first outer jacket layer has a thickness in a range of 0.4 mm±0.1 mm.

6. The optical fiber cable as recited in claim 1, wherein the third outer jacket layer has a thickness in a range of 0.4 mm±0.1 mm.

7. The optical fiber cable as recited in claim 1, wherein the second covering layer has a thickness in a range of 0.225 mm±0.05 mm and a diameter in a range of 1.8 mm±0.05 mm.

8. The optical fiber cable as recited in claim 1, wherein the first covering layer has a thickness in a range of 0.2 mm±0.05 mm.

9. The optical fiber cable as recited in claim 1, wherein the strength member has a diameter in a range of 1.2 mm±0.05 mm.

10. An optical fiber cable comprising:
a strength member substantially symmetrical along a longitudinal axis of the optical fiber cable, wherein the strength member is made of a composite material made of a polymer matrix and wherein the strength member is centrally located;
a plurality of fiber units being laid around the strength member in a helical pattern, wherein each of the plurality of fiber units comprises:
one or more optical fibers;
a first covering layer;
a second covering layer; and
a gel,
wherein the first covering layer is enclosed by the second covering layer, wherein the first covering layer encloses the gel, wherein each of the one or more optical fibers is enclosed by the first covering layer, wherein the second covering layer is made of a thermoplastic material and the first covering layer is made of an acrylic material, wherein a coefficient of thermal expansion of the thermoplastic material is less than $2.0\times10^{-4}/°$ C.; and
an outer jacket surrounding the plurality of fiber units, wherein the outer jacket further comprises:
a first sub-layer;
a second sub-layer;
a third outer jacket layer;
a second outer jacket layer; and
a first outer jacket layer,
wherein the second outer jacket layer is made of thermoplastic polyurethane and the first outer jacket layer is made of aramid yarns and the first sub-layer includes aramid yarns wound around the third outer jacket layer, wherein the third outer jacket layer is made of 85A polyether type thermoplastic polyurethane and wherein the second outer jacket layer surrounds the first outer jacket layer.

* * * * *